(12) United States Patent
Schilthuizen et al.

(10) Patent No.: US 6,341,718 B1
(45) Date of Patent: Jan. 29, 2002

(54) SQUEEZE BOTTLE FOR DISPENSING A LIQUID IN A METERED AND SUBSTANTIALLY GERM-FREE MANNER

(75) Inventors: Stephanus Fransiscus Schilthuizen, Berkel Enschot; Lukas Wilhelmus van Hees, Voorburg, both of (NL)

(73) Assignee: V.O.F. PharmAsept, Va Peize (NL)

( * ) Notice: Subject to any disclaimer, the term of this patent is extended or adjusted under 35 U.S.C. 154(b) by 0 days.

(21) Appl. No.: 09/875,130

(22) Filed: Jun. 7, 2001

Related U.S. Application Data

(63) Continuation of application No. PCT/NL99/00750, filed on Dec. 7, 1999.

(30) Foreign Application Priority Data

Dec. 7, 1998 (NL) .............................................. 1010749

(51) Int. Cl.$^7$ .............................................. B65D 37/00
(52) U.S. Cl. ..................................................... 222/207
(58) Field of Search ............................... 222/205, 207, 222/211

(56) References Cited

U.S. PATENT DOCUMENTS

| | | | |
|---|---|---|---|
| 3,240,399 A | 3/1966 | Frandeen | |
| 3,258,175 A | 6/1966 | Taylor | |
| 3,910,467 A | 10/1975 | Nilson | |
| 4,376,495 A | 3/1983 | Spatz | |
| 4,972,977 A | 11/1990 | Moss et al. | |
| 5,186,367 A | * 2/1993 | Hickerson | ................... 222/207 |
| 5,232,687 A | 8/1993 | Geimer | |
| 5,310,094 A | 5/1994 | Martinez et al. | |
| 5,339,972 A | 8/1994 | Crosnier et al. | |
| 5,829,645 A | 11/1998 | Hennemann | |
| 5,967,377 A | * 10/1999 | Glynn | ........................ 222/207 |
| 6,241,129 B1 | * 6/2001 | Bonnigue et al. | ........... 222/207 |

FOREIGN PATENT DOCUMENTS

| | | |
|---|---|---|
| DE | 43 10 019 | 4/1994 |
| EP | 0 473 892 | 6/1991 |
| EP | 0 701 108 | 9/1994 |
| WO | 94/11115 | 5/1994 |

* cited by examiner

*Primary Examiner*—Philippe Derakshani
*Assistant Examiner*—Thach H. Bui
(74) *Attorney, Agent, or Firm*—Browdy and Neimark

(57) ABSTRACT

The invention describes a squeeze bottle for dispensing a liquid, in particular a liquid medicament, in a metered and substantially germ-free manner, at least comprising: a storage chamber for accommodating the liquid, a metering chamber with a variable volume for dispending from this chamber, under reduction of volume of the chamber, a measured volume of liquid, restoring means for returning the metering chamber to its original state after a volume of liquid has been dispensed, an inlet for placing the metering chamber in communication with the storage chamber by mediation of a flow restrictor, which flow restrictor counteracts flow from the metering chamber to the storage chamber substantially completely when the pressure in the storage chamber is increased, counteracts flow between the storage chamber and the metering chamber substantially completely and , when the increase pressure in the storage chamber is removed, allows flow from the storage chamber into the metering chamber, at least one outflow opening for placing the interior of the metering chamber in communication with the environment, the outflow opening comprising a non-return valve, actuating means can be actuated by squeezing the bottle, means for ventilating the squeeze bottle.

15 Claims, 5 Drawing Sheets

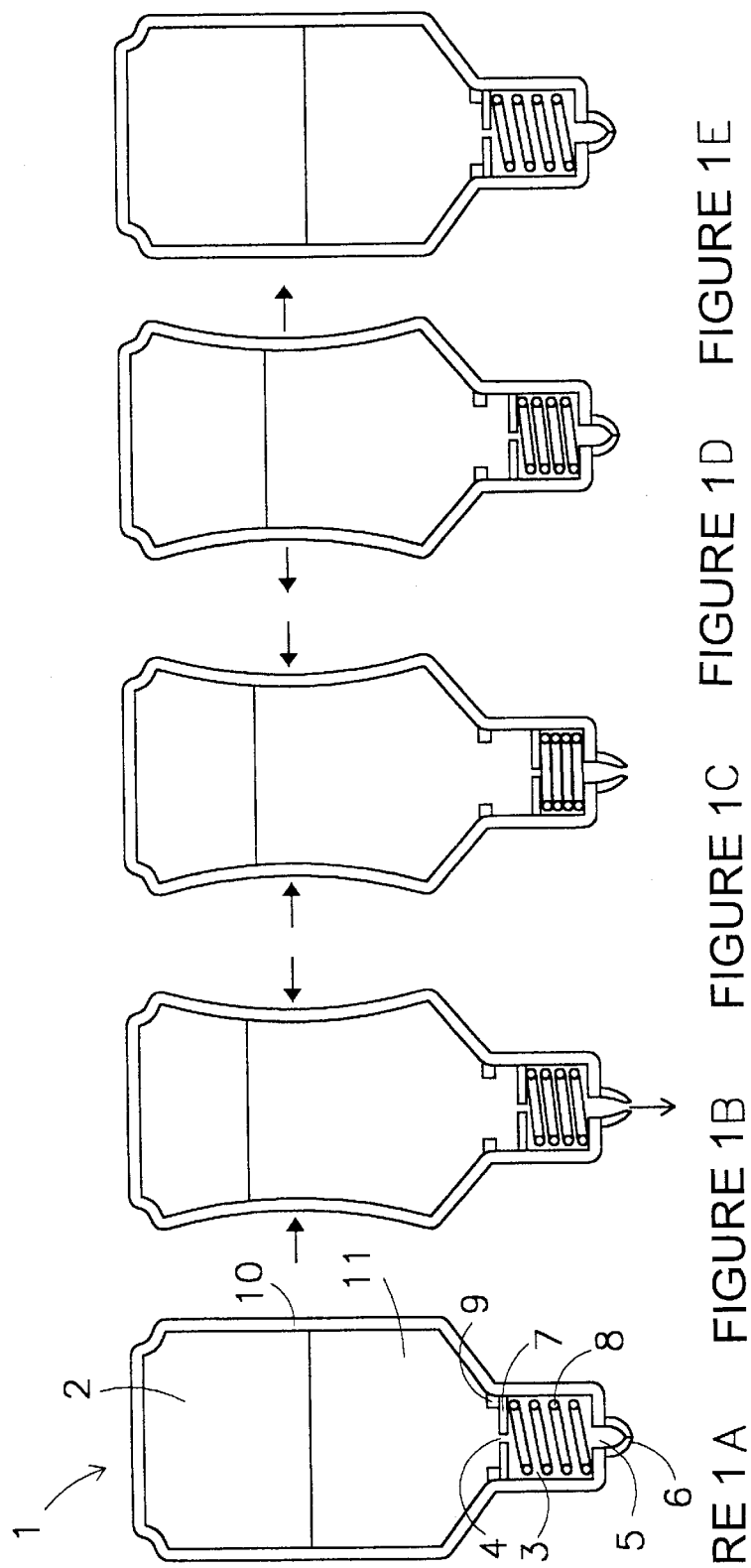

Figure 2B:
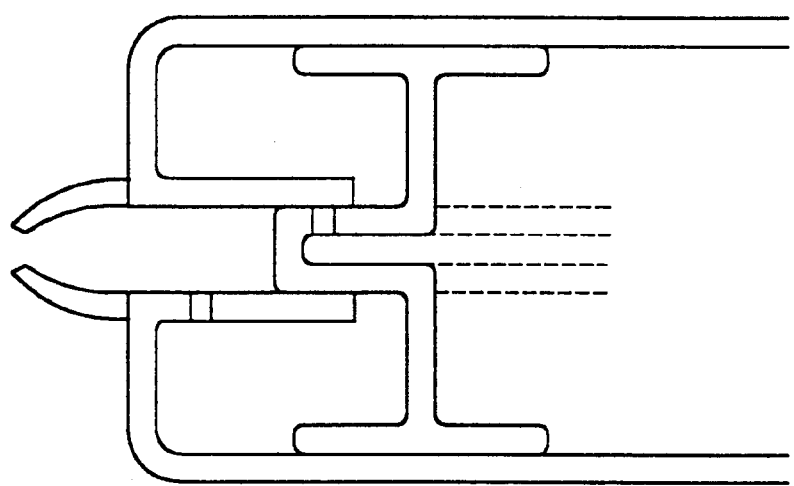

SQUEEZE BOTTLE FOR DISPENSING A LIQUID IN A METERED AND SUBSTANTIALLY GERM-FREE MANNER

This application is a Continuation of PCT/NL99/00750 filed Dec. 7, 1999.

This invention relates to a squeeze bottle for dispensing a liquid, in particular a liquid medicament in a metered and substantially germ-free manner. In this invention, a squeeze bottle is to be understood as a container with a flexible wall, whereby by squeezing the container at the location of the flexible wall pressure is exerted to the contents of the container, whereby the contents are dispersed via a dispense opening.

In the art, squeeze bottles for dispensing a liquid in an unmetered sterile manner are known. In this respect, U.S. Pat. No. 5,154,325 describes a squeeze bottle having a duckbill valve, in which valve an antimicrobial component is present to keep dispensed liquid, remaining behind at the outer side of the valve, in sterile condition. Ventilation takes place via a sterile filter. A duckbill valve is to be understood as a tubular structure of flexible material, the end portion thereof defining an outflow opening, which opening is closed in rest position. This closed position is effected by a biased tension that is exerted by the tube wall at the location of the end portion in inner direction. The level of biased tension is dependent on the material chosen and can e.g. be increased by applying around the tube a fitting, optionally tapered ring-shaped element.

In U.S. Pat. No. 5,310,094 a squeeze bottle is described, wherein the dispense opening comprises two serially arranged duckbill valves. This construction prevents material that is dispensed from the last duckbill valve from flowing back into the container. The above-described squeeze bottles are however not suitable for dispensing in a metered manner.

Dosing devices for dispensing under metered conditions are also known. In U.S. Pat. No. 3,910,467 a tube for dispensing pasty material in a metered manner is described. The tube contains a metering chamber with a valve, which valve is partly in contact with the outer environment. By pressure on the tube the valve is opened, whereby a portion of the contents of the metering chamber is dispensed. During opening of the valve, the valve portion, which in closed condition of the valve is in contact with the outer environment in a non sterile manner, comes into contact with the contents of the metering chamber, whereby dispensing in a sterile manner is not guaranteed. In the device, described in DE-C-4310019, wherein a squeeze bottle is described with a metering chamber and a dispensing opening that can be closed by a valve, the valve is, in its closed position, in its entirety located in the metering chamber that is filled with liquid. By pressure on the squeeze bottle a major portion of the valve is moved from the metering chamber into the outer environment, resulting in a high risk of contamination. This device is therefore not suitable for dispensing in a sterile manner as well. In U.S. Pat. No. 4,376,495 a tube is described, wherein the volume of a metering chamber is adjusted with the aid of a needle-shaped element, accommodated in a screw cap, which element, in closed condition, contacts the material to be dispensed, present in the metering chamber. For dispensing, the cap is removed and the needle-shaped element is in contact with the environment. At reclosure of the device, there is a substantial risk of contamination. Also in EP-A-0 701 108 a metering device for liquids is described, wherein the liquid is dispensed from a stock container via a metering chamber. The volume of the metering chamber can be adjusted by means that come into contact with both the air from the environment as well as with the metering chamber, resulting in dispensing in a sterile manner being impossible from this device.

Further, numerous containers having fixed walls for dispensing liquids in a metered and a germ-free manner are known; such containers are for this purpose moreover provided with complicatedly engineered pumping devices. Actuating such devices therefore takes place by depressing a pumping element, and not by squeezing the walls of the container, like a squeeze bottle. Examples of metering pumps for dispensing a liquid in a metered way are described in e.g. EP-B-0 473 892, of which parts of the pump, that contact the liquid to be dispensed, such as the dispensing passage or the walls of the metering chamber, comprise an oligodynamic agent. In U.S. Pat. No. 5,253,788 a combination of a squeeze bottle and a pump containing a metering chamber is described. The metering chamber of this squeeze bottle is in communication, via a non-return valve, with a storage chamber containing a cosmetic preparation. By squeezing the squeeze bottle, the valve is opened, and the preparation can then flow into the metering chamber. To dispense the contents of the metering chamber to the environment, it is necessary to depress an actuating component; during this movement, the abovementioned non-return valve is closed, so that it is impossible for any material to flow back out of the metering chamber into the storage chamber. Therefore, two separate movements have to be carried out in order to meter and dispense a metered unit from the said squeeze bottle, namely squeezing the squeeze bottle and depressing the actuating component.

In the art, there is however a great need for a squeeze bottle for dispensing liquid in a metered and substantially germ-free manner. The advantage of a squeeze bottle is the simple actuation thereof and the possibility for cheap production on an industrial scale.

The invention therefore provides a squeeze bottle for dispensing a liquid, in particular a liquid medicament, in a metered and substantially germ-free manner, at least comprising:

a storage chamber for accommodating the liquid, a metering chamber with a variable volume for dispensing from this chamber, under reduction of volume of the chamber, a measured volume of liquid, restoring means for returning the metering chamber to its original state after a volume of liquid has been dispensed, an inlet for placing the metering chamber in communication with the storage chamber by mediation of a flow restrictor, which flow restrictor counteracts flow from the metering chamber to the storage chamber substantially completely and, when the pressure in the storage chamber is increased, counteracts flow between the storage chamber and the metering chamber substantially completely and, when the increased pressure in the storage chamber is removed, allows flow from the storage chamber into the metering chamber, at least one outflow opening for placing the interior of the metering chamber in communication with the environment, the outflow opening comprising a non-return valve, which exclusively allows flow in the intended dispense direction, the valve being designed in such a way that valve portions that are, in closed position, in direct contact with the environment, are also located outside the metering chamber in opened position of the valve, and valve portions that are, in opened position, in direct contact with the environment, are also located outside the metering chamber in closed position of the valve, actuating means for reducing the volume of the metering chamber, which actuating means can be actuated by squeezing the bottle, means for ventilating the squeeze bottle.

In the context of this application, germ-free conditions are also understood to mean low-germ conditions, which term is defined in the European Pharmacopoeia (3rd edition).

Germs are to be understood as all biologically multipliable life forms, comprising e.g. bacteria, spores of bacteria, fungi, yeast cells etc.

By applying pressure to the storage chamber by squeezing the wall of the squeeze bottle an increased pressure is exerted on the metering chamber. This increased pressure reduces the volume of the metering chamber, for example by a partition between the storage chamber and the metering chamber, on which the said increased pressure is exerted, being at least partially depressed. As a result of the reduction in volume of the metering chamber, the valve will be opened at the location of the outlet and the contents of the metering chamber will be dispensed, while feed from the storage chamber as well as dispensing to the storage chamber, is substantially blocked.

As soon as the pressure on the tock chamber is removed, the metering chamber is forced back into the original state, for example spring means. When this increase in the volume of the metering chamber takes place, the flow restrictor allows flow to take place from the storage chamber to the metering chamber, so that the metering chamber is filled with material to be dispensed. The material which is situated in the metering chamber is dispensed by increasing the pressure on the storage chamber, as has been explained above.

By the fact that the outflow opening comprises a non-return valve, it is prevented that after dispensing, a passage in the squeeze bottle remains filled with liquid, which liquid will be dispensed in the next metering action, and remains, until said action, in contact with the environment and susceptible to contamination. To counteract contamination, the valve in the squeeze bottle according to the invention is furthermore designed in such a way, that the valve portions that come into contact with the metering chamber do not come in contact with the outer environment and vice versa, so that contamination or fouling of the liquid in the metering chamber via the non-return valve is virtually excluded.

During ventilation of the squeeze bottle according to the invention it is to be prevented that the contents of the bottle come into contact with germs from the air resulting into contamination.

The ventilating means in the squeeze bottle according to the invention can e.g. be designed as a sterile hydrophobic filter that can be accommodated in or at the vicinity of the bottom of the squeeze bottle wall. In order to prevent leakage through the filter when the squeeze bottle is squeezed, the ventilating means may comprise a non-return valve at the inside of the squeeze bottle, which valve is opened at ventilation of the storage chamber, and is closed in relaxed position of the squeeze bottle or during squeezing thereof. Such sterile ventilation means are generally known in the art, see e.g. WO 94/11115. When a filter is applied, the openings thereof are preferably maximally 0,2 $\mu$m.

The ventilating means may also comprise an opening in the wall of the squeeeze bottle, wherein the liquid in the storage chamber is accommodated in a bag of flexible material, which bag is connected in a sealed manner with the metering chamber. In this way the air, taken up in the storage chamber during ventilation cannot come into contact with the liquid. Suitable materials for the bag which may be mentioned are optionally organic additives comprising thermoplastic materials, or a laminate of thermoplastic materials with high. gas barrier properties.

Thus, as a result of squeezing the squeeze bottle, material is dispensed from the metering chamber in a sterile way and the metering chamber is filled again after squeezing, i.e. when the squeeze bottle regains its original volume.

Further embodiments of the squeeze bottle according to the invention are explained in the subclaims.

Figure 3C:
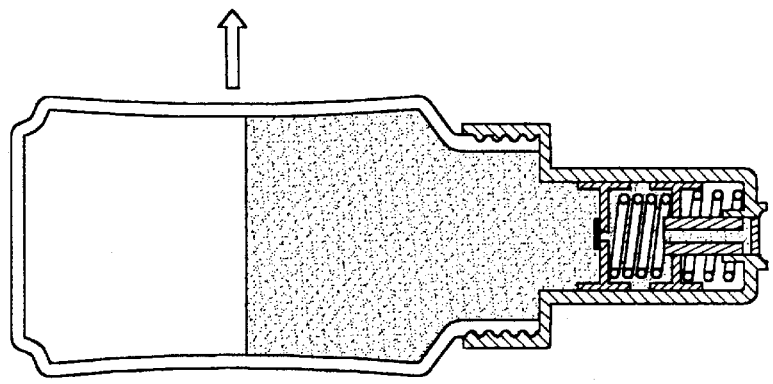
Figure 3B:
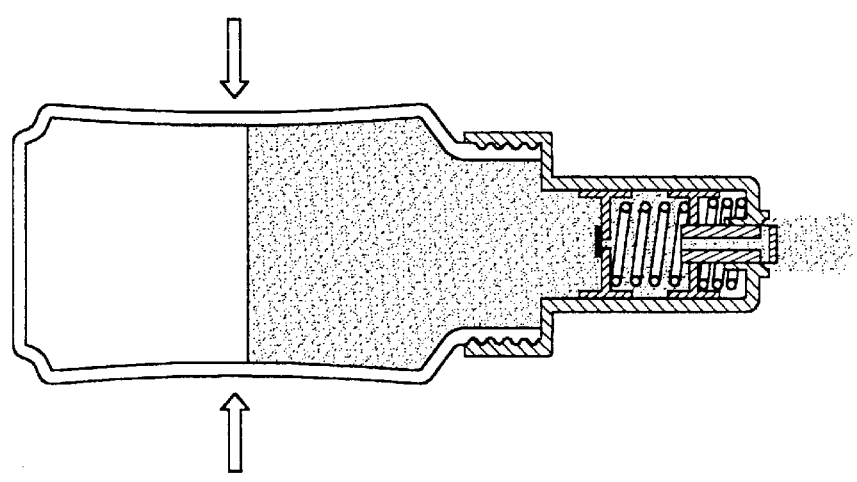
Figure 3A:
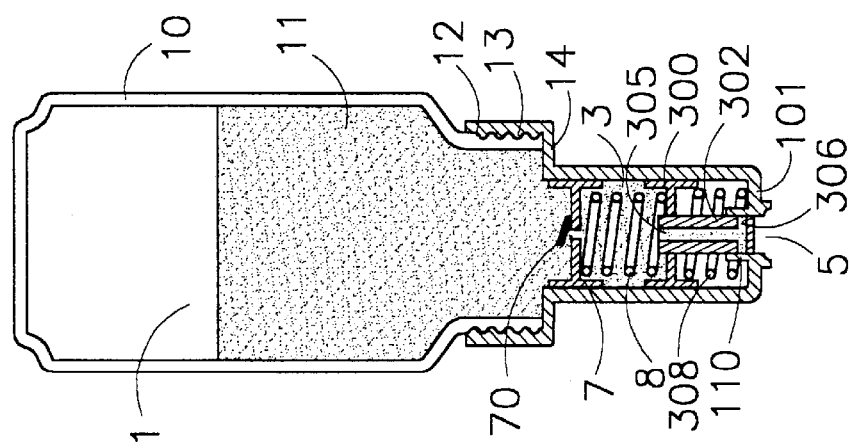
Figure 4:
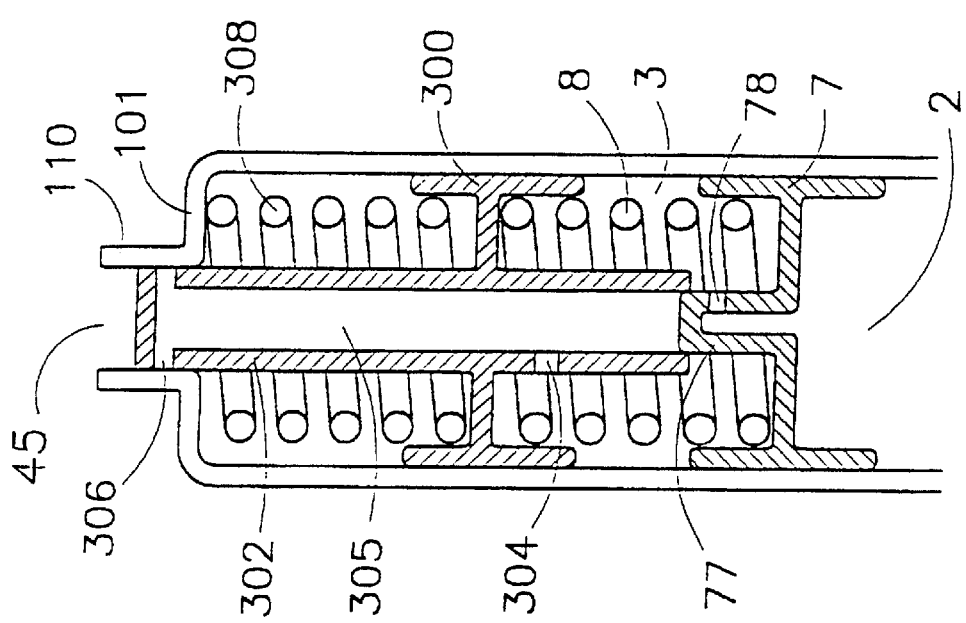

The invention will be explained in more detail with reference to the following drawing, in which:

FIG. 1 shows a cross section through a simple embodiment of a squeeze bottle according to the invention when at rest, when dispensing and when metering, FIG. 2 shows a cross section through a metering chamber without and with increased pressure being exerted on the storage chamber, FIG. 3 shows a cross section through a squeeze bottle according to another embodiment of the invention with a metering chamber, when at rest, when dispensing and when metering, FIG. 4 shows a cross section through another embodiment of the metering chamber when at rest, FIG. 5 shows a cross section through the squeeze bottle according to another embodiment of the invention, in which the metering chamber is designed as a bellows-like body and the liquid is accommodated in a bag.

In FIG. 1A, 1 denotes a squeeze bottle having wall 10 and a storage chamber 2 in which liquid 11, such as a liquid medicament, may be accommodated. The storage chamber is separated from a metering chamber 3 by a movable piston 7 which is provided with a small opening 4 through which liquid can flow out of the storage chamber into the metering chamber when the volume of the metering chamber is increased. On the opposite side from the piston, the metering chamber comprises an outflow opening 5 which is provided with a duckbill valve 6. A spring 8, which presses piston 7 against a stop 9 and prevents piston 7 from moving into the storage chamber 2, is accommodated in the metering chamber 3. If the piston 7 is fixed in the metering chamber and is attached to the spring 8, stop 9 can be omitted. In this situation, the metering chamber is full. Opening 4 is selected to be so small that the inherent weight of the liquid does not cause it to flow out of the metering chamber into the storage chamber. In the case of an aqueous liquid, the diameter, if the opening is circular, may be between 0.1 mm and 1.0 mm, but is preferably between 0.3 and 0.7 mm, and most preferably 0.4–0.5 mm.

In FIG. 1B, pressure is exerted on the storage chamber 2 by squeezing the wall 10 (as indicated by two horizontal arrows), with the result that piston 7 is moved towards outlet opening 5. As a result, spring 8 is compressed, the volume of the metering chamber is reduced and a volume of liquid amounting to the reduction in volume of the metering chamber is dispensed out of the metering chamber to the environment through duckbill valve 6. It has been found that, by suitably selecting the dimension of the opening 4 and providing sufficiently low flow resistance at the outlet valve, in this case duckbill valve 6, no liquid, or scarcely any liquid, flows back out of the metering chamber into the storage chamber when the above-described reduction in volume of the metering chamber takes place, but that virtually the entire contents of the metering chamber are dispensed to the environment.

FIG. 1C shows the situation in which piston 7 has moved into its outermost position and the metering chamber has been emptied by the squeeze bottle wall 10 being compressed. A metered volume has now been dispensed to the environment.

In FIG. 1D, the pressure on the squeeze bottle has been removed by the fact that the squeeze bottle is no longer being compressed (as illustrated by the horizontal arrows). As a result, duckbill valve 6 is closed and piston 7 is moved in the direction of the side which is remote from the outlet opening 6 by the spring pressure of spring 8, with the result that the volume of metering chamber 3 increases. As a result of the associated underpressure in the metering chamber, liquid flows out of the storage chamber 2 into the metering chamber 3, as long as the squeeze bottle is held with the outflow opening directed downwards as illustrated, during which environmental air is taken up in the storage chamber 2 via ventilating means (not shown).

The ventilating means can e.g. comprise an opening with a hydrophobic sterile filter in the squeeze bottle wall, e.g. in the bottom thereof. It is of course also possible that ventilation means may be accommodated in the side wall of the squeeze wall of the squeeze bottle, if desired in the vicinity of the metering chamber. It is of importance that these ventilating means allow entry of air into the storage chamber, but prevent entrance of germs that are present in the air into the liquid.

When piston 7 is pressed against stop 9, the metering chamber has been completely filled, as illustrated in FIG. 1E. FIG. 1E is identical to FIG. 1A, except that the volume of the liquid 11 has decreased by one metered volume.

FIG. 2 shows an embodiment in which the flow restrictor is designed not just as a narrow opening but as an active valve. The same numbers as those used in FIG. 1 have been employed for corresponding components. Advantages of this embodiment are that liquid is prevented from flowing back out of the metering chamber into the storage chamber and that if desired the squeeze bottle can be used in the upright position. In that case, the valve must be connected to a riser (part of which is shown by a dashed line), the open end of which must be situated in the liquid in storage chamber 1.

Figure 2A:
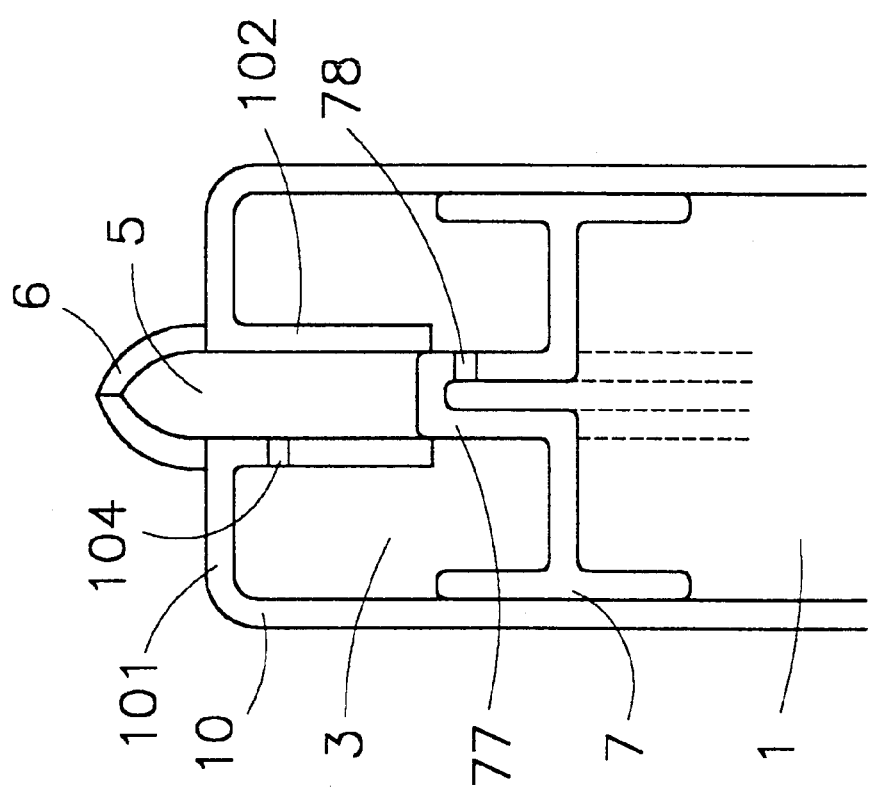

In FIG. 2A, no pressure is being exerted on the storage chamber 2 and metering chamber 3 is full of liquid. For the sake of clarity, no restoring means, such as a spring, are shown, although these must be present, as illustrated in FIG. 1, in order to return the metering chamber to its original state. Piston 7 contains a cylindrical component 77 which is closed on the top side and is provided with an opening 78. Wall 10 comprises a shoulder 101 which delimits the metering chamber 3 and on which a cylinder 102 which is open on two sides is formed, which cylinder defines an outflow passage S. One of the openings forms an outflow opening and is connected to duckbill valve 6. The wall of cylinder 102 contains an opening 104. The outer circumference of cylindrical component 77 substantially corresponds to the inner circumference of cylinder 102, so that cylindrical component 77 can slide into cylinder 102 in a sealed manner. In the situation illustrated, metering chamber 3 is full; opening 78 is selected to be so small that the force of gravity does not cause liquid to flow back into the storage chamber. The outflow opening S is closed.

When pressure is exerted on the storage chamber 2, piston 7, as illustrated in FIG. 2B, will move towards the outlet opening (counter to a spring pressure), with the result that cylindrical component 77 is slided into cylinder 102, and opening 78 is closed. It is therefore impossible for liquid to flow from the storage chamber 2 into the metering chamber 3 or vice versa. The movement of the piston reduces the volume of the metering chamber 3 and the contents of the metering chamber are dispensed to the environment via opening 104, outflow passage 5 and duckbill valve 6. When the increased pressure in storage chamber 2 is removed, piston 7 will be moved back to the position shown in FIG. 1A by the spring (not shown), and duckbill valve 6 is closed. As soon as cylindrical component 77 has slid sufficiently far out of cylinder 102 for opening 78 to connect storage chamber 2 to the interior of metering chamber 3, the metering chamber 3 will be filled again with liquid from storage chamber 2.

FIG. 3A shows a squeeze bottle with a metering chamber 3 which is filled with liquid 11, which squeeze bottle comprises a movable piston 7, in which an active valve 70 is diagrammatically depicted, which active valve is, in relaxed condition of the squeeze bottle, in the open position, similar to the situation illustrated in FIG. 2. The valve may however also be designed in such a way, that it is closed in relaxed condition of the squeeze bottle. The open condition can e.g. be obtained by valve 70 being kept open by spring action (not shown) On the side opposite the first piston 7, metering chamber 3 is delimited by a second piston 300 which can move in the direction away from the storage chamber 2. The movement of the second piston 300 is limited by shoulder 101 of the squeeze bottle. A spring 308 is accommodated between shoulder 101 and the piston 300, which spring exerts a force in the direction of the storage chamber 2 on the piston 300. A spring 8 is accommodated between the first piston 7 and the second piston 300, in order to restore the volume of the metering chamber to the original state. Second piston 300 comprises a cylinder 302 which is open on two sides and is provided with an internal passage 305, which passage opens out into two outlet passages 306 which, in the case illustrated, are closed off by vertical wall 110.

Metering chamber 3, including pistons 7 and 307 and springs 8 and 308 are accommodated in a lid component 14 which, by means of an internal screw thread 13, is attached to a matching external screw thread 12 on the neck of the squeeze bottle.

By squeezing the wall 10, as shown in FIG. 3B, valve 70 is closed and piston 300 and piston 7 will be moved towards the outlet opening 35, counter to the pressure of spring 308, until outlet passages 306 have been pushed beyond vertical wall 110. Then, spring 8 will be compressed as the volume of metering chamber 3 is reduced and liquid is dispensed from this chamber to the environment, until both springs 8 and 308 are fully compressed or the movement of one or both pistons 7 and 300 is halted by a stop. This situation is illustrated in FIG. 3C.

Removing the pressure in the storage chamber 2 (as illustrated by horizontal arrows) will cause both springs 8 and 308 and pistons 7 and 307 to be returned to the original position, i.e. the position illustrated in FIG. 3A, closing outlet passages 306 and opening valve 70, so that the metering chamber 3 is filled with liquid.

In this embodiment, the portions of the non-return valve that, either in open or closed condition, come in contact with the environment (cylinder 302 in the vicinity of outflow passages 306) do not come in contact with the metering chamber 3. Thus with this non-return valve as well, a contamination of the liquid in the metering chamber is substantially excluded.

The spring constants of springs 8 and 308 are preferably equal, so that optimum operation is ensured, although the spring constants may differ from one another. If, for example, spring 308 is stronger than spring 8, both pistons 7 and 307 will be pushed towards the outflow opening 45 by the increase in the liquid pressure. After the liquid pressure has been removed, when the liquid is dispensed from the metering chamber to the environment, both pistons will spring back again.

FIG. 4 illustrates a metering chamber 7 which is suitable for use in the squeeze bottle as illustrated in FIG. 3. In this figure, components which have already been discussed in connection with the previous figures are provided with corresponding reference numerals and are not explained in such detail.

FIG. 4 illustrates a squeeze bottle with a metering chamber 3 which is separated from storage chamber 2 by a first piston 7 which has a cylindrical component 77 which is closed on one side and in which an opening 78 is incorporated. On the side opposite the first piston 7, metering chamber 3 is delimited by a second piston 300 which can move in the direction away from the storage chamber 2. The movement of the second piston 300 is limited by shoulder 101 of the squeeze bottle. A spring 308, which exerts a force towards the storage chamber 2 on the piston 300, is accommodated between shoulder 101 and the piston 300. A spring 8 is accommodated between the first piston 7 and the second piston 300, in order to return the volume of the metering chamber to its original state. Second piston 300 comprises a cylinder 302 which is open on two sides and which is provided with an internal passage 305, which passage opens out into two outlet passages 306, which in the situation illustrated are closed off by means of vertical wall 110. The wall of cylinder 302 contains an opening 304. The outer circumference of cylindrical component 77 substantially corresponds to the inner circumference of cylinder 302, so that cylindrical component 77 can slide into cylinder 302 in a sealed manner. In the case illustrated, metering chamber 3 is full; opening 78 is selected to be so small that the force of gravity cannot cause the liquid to flow back into the storage chamber. The outflow opening 45 is closed. As in the cases illustrated in FIGS. 2 and 3, in the event of a pressure inside storage chamber 2, pistons 7 and 300 will be moved towards outflow opening 45 until outflow passages 306 have been pushed passed vertical wall 110. Then, spring 8 will be compressed, while the volume of metering chamber 3 is reduced and liquid is dispensed from this chamber to the environment, until both springs 8 and 308 have been fully compressed, after which the metering chamber can be filled again with liquid from storage chamber 2 by removing the pressure in storage chamber 2, in a similar manner to the case illustrated in FIG. 3.

Figure 5C:
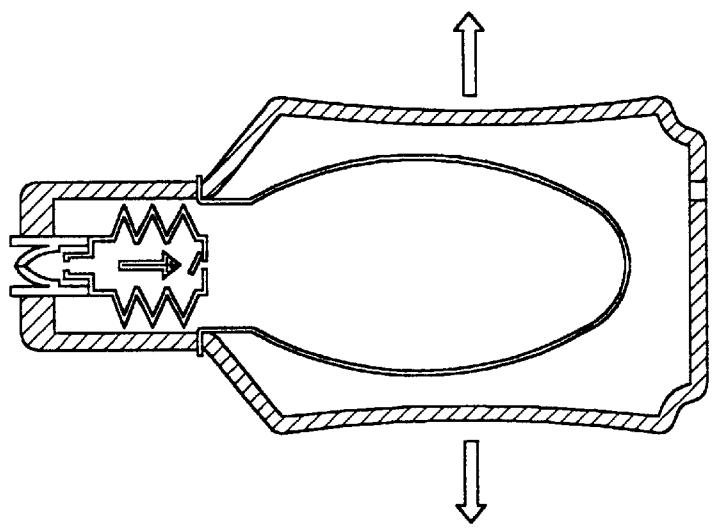
Figure 5B:
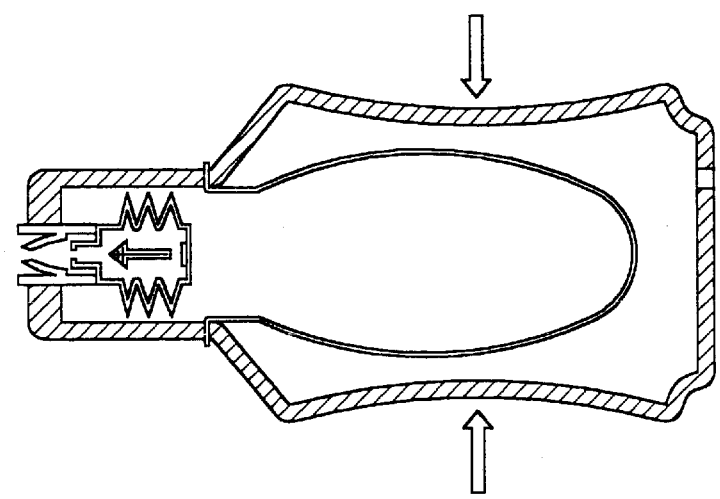
Figure 5A:
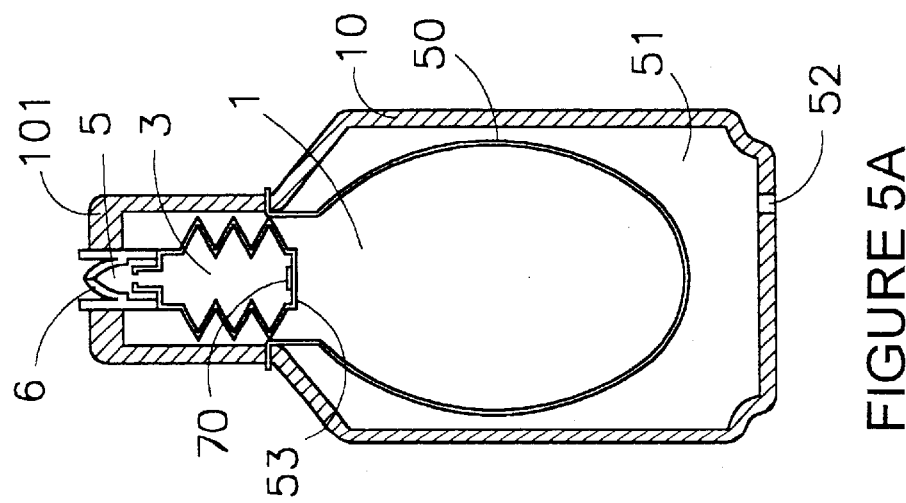

FIGS. 5A–5C shows an embodiment of a squeeze bottle according to the invention in which the metering chamber 3 is of bellows-like design.

In the illustrated case, the ventilating means comprise an opening 52 in squeeze bottle wall 10, and a bag 50 of flexible material is accommodated in storage chamber 51, which bag is connected to the metering chamber in a sealed manner. In the illustrated case, the bag can advantageously be integrally formed with the bellows. In the case that such a bag is accommodated in the storage chamber, the space in the storage chamber, not taken by the bag is called "ventilating space", which is denoted in the present case with 51 as well.

In opening 52, a non-return valve may be accommodated, which valve allows air from the environment into the ventilating space 51 but prevents air from flowing out of this space 51 to the atmosphere, in order to ensure, when the squeeze bottle wall is compressed as illustrated in FIG. 5B, that pressure is exerted on the ventilating space 51, and therewith on the contents of bag 50, as a result of the wall 10 being compressed.

By squeezing the wall 10, the pressure in space 51 and in the bag 50 will be increased, with the result that the bellows are compressed. In functional terms, wall 53 of the bellows is similar to piston 7 in, for example, FIG. 3A. In this case, a valve 70 likewise prevents liquid from flowing back out of the metering chamber 3 into the bag and is closed when the pressure in the space is increased, but allows liquid to flow out of the bag into the metering chamber when the increased pressure is removed. The space around the bellows will be able to fill up with liquid, a fact which does not present any problems.

The outlet opening 5 of metering chamber 3 comprises a duckbill valve 6 which will be opened when the wall 10 is squeezed.

When the wall 10 is released, as shown in FIG. 5C, the inherent elasticity of the bellows will cause it to return to its original volume, as illustrated in FIG. 5A. During this movement, the metering chamber will be able to fill up with liquid from the bag. While the wall is being released, air will be received in the intermediate space 51 from the environment.

In a similar manner to the case illustrated in FIG. 5, it is possible to design a squeeze bottle in accordance with FIG. 1 or 3 with a flexible bag and to provide the wall with an opening for the uptake of environmental air. In this case, the bag may, for example, be attached between the lid component and the neck of the squeeze bottle.

When the ventilating means in the squeeze bottle according to the invention comprise a flexible bag as described above, the squeeze bottle can be designed as an atomiser in a simple manner, wherein the squeeze bottle is provided with one or more passages or channels, of which the one end ends in the ventilation space and the other end ends in the close vicinity of the outflow opening of the squeeze bottle. When the squeeze bottle is squeezed for the discharge of liquid, air will be blown from ventilation space 51 along the non-return valve via the above-described passages/channels, in addition to the discharge of liquid through the non-return valve, resulting, at the location of the valve, in the air atomising the liquid just discharged. In such a case, the ventilation opening in the squeeze bottle wall may comprise a sterile sieve in order to prevent entry of germs from the air into the ventilation space 51 and into the atomised spray.

The outflow opening of the squeeze bottle may have any desired form, depending on the intended dispensing method. For example, the squeeze bottle may be designed as a dropper or atomizer, but also be suited as an injection syringe, for example by designing the outlet opening to fit onto an injection needle.

The fact that the liquid is unable to flow back out of the metering chamber into the storage chamber means that the squeeze bottle according to the invention is particularly suitable for dispensing a liquid under aseptic (i.e. germ-free) conditions.

In a special embodiment of the squeeze bottle according to the invention, an additional non-return valve may be located between the non-return valve and the metering chamber in order to minimize the risk of contamination of the liquid in the metering chamber even further.

In order to optimize the aseptic dispensing, it is possible to employ aseptic measures, such as accommodating a bacteriostatic or oligodynamic agent, such as a silver compound, which is preferred. By bacteriostatic or oligodynamic agent an agent is meant that counteracts growth of bacteria and other germs, or even kills them. Particularly advantageously, the aseptic material is moulded into one or more squeeze bottle components, or a component with which the liquid comes into contact is coated with a bacteriostatic or oligodynamic agent, such as a silver compound. The bacteriostatic or oligodynamic agent preferably comprises a silver zeolite, e.g. the silver zeolite, distributed by Sinanen, Japan, under the trade name "ZEOMIC". Using such a silver zeolite in a squeeze bottle according to the invention, growth of germs was not observed. As such a bottle component, a part of the wall of the metering chamber or a spring, being accommodated within the metering chamber are very suitable. The agent can in such a case be taken up into the liquid. In the metering chamber an amount of liquid is present that will be dispensed during the first subsequent use of the squeeze bottle. In order to obtain a sufficient aseptic discharge, it is sufficient to bring the volume of the liquid that is present in the metering chamber into contact with the bacteriostatic or oligodynamic agent. In such a way, it is not the entire liquid stock that comes into contact with the bacteriostatic or oligodynamic agent. It is of course also possible to provide the squeeze bottle wall, the flexible bag (if present), or the non-return valve of the outflow opening with such a bacteriostatic or oligodynamic agent. It is also possible to accommodate separate granular elements, containing a bacteriostatic or oligodynamic agent in the metering chamber.

The invention furthermore relates to a metering chamber as described above, for attachment to a squeeze bottle for accommodating a liquid to be metered, in particular a liquid medicament, such as eye drops, etc.

As has already been described with reference to FIG. 3A, a metering chamber of this nature may comprise screw means for attachment to the screw thread of a squeeze bottle; however, all known attachment means, such as a click-fit or bayonet connection, are possible within the scope of the invention.

Obviously, the invention is also suitable for dispensing other liquids which become rapidly contaminated by bacteria or must not be contaminated, for example cosmetics. The squeeze bottle can also be used for metered dispensing of a medicament for injection to a cylinder of an injection syringe, or may itself be used as the injection syringe. The squeeze bottle is extremely simple to operate, making the squeeze bottle particularly suitable for use as an injection syringe to be utilized by patients themselves, for example patients suffering from diabetes or allergies.

What is claimed is:

1. Squeeze bottle (1) for dispensing a liquid, in particular a liquid medicament, in a metered and substantially germ-free manner, at least comprising:

a storage chamber (2) for accommodating the liquid, a metering chamber (3) with a variable volume for dispensing from this chamber, under reduction of volume of the chamber, a measured volume of liquid, restoring means (8) for returning the metering chamber to its original state after a volume of liquid has been dispensed, an inlet (4) for placing the metering chamber in communication with the storage chamber by mediation of a flow restrictor, which flow restrictor counteracts flow from the metering chamber to the storage chamber substantially completely and, when the pressure in the storage chamber is increased, counteracts flow between the storage chamber and the metering chamber substantially completely and, when the increased pressure in the storage chamber is removed, allows flow from the storage chamber into the metering chamber, at least one outflow opening (5) for placing the interior of the metering chamber in communication with the environment, the outflow opening comprising a non-return valve (6), which exclusively allows flow in the intended dispense direction, the valve being designed in such a way that valve portions that are, in closed position, in direct contact with the environment, are also located outside the metering chamber in opened position of the valve, and valve portions that are, in opened position, in direct contact with the environment, are also located outside the metering chamber in closed position of the valve, actuating means (7) for reducing the volume of the metering chamber, which actuating means can be actuated by squeezing the bottle, means for ventilating the squeeze bottle.

2. Squeeze bottle according to claim 1, characterized in that the flow restrictor is designed as an active valve.

3. Squeeze bottle according to claim 1 or 2, characterized in that the metering chamber is at least partially accommodated in the storage chamber and comprises a bellows-like body which is compressed by the pressure in the storage chamber being increased.

4. Squeeze bottle according to claim 1 or 2, characterized in that the metering chamber is separated from the storage chamber by a first movable piston (7), which piston is, under spring load, moved towards the outlet by the pressure in the storage chamber being increased.

5. Squeeze bottle according to claim 4, characterized in that the metering chamber is delimited, on the opposite side from the first piston, by a second piston (300), which is, under spring load, moveable in the direction away from the storage chamber, as far as a stop, first and second spring means (8, 308) being respectively accommodated between the first and second piston and between the second piston and the stop.

6. squeeze bottle according to claim 5, characterized in that the spring constants of the first and second springs are substantially equal.

7. Squeeze bottle according to claim 1, characterized in that the non-return valve (6) is a duckbill valve.

8. Squeeze bottle according to claim 1, characterized in that the ventilating means comprises an opening in the wall of the squeeze bottle, wherein the liquid in the storage chamber is accommodated in a bag of flexible material, which bag is connected in a sealed manner with the metering chamber.

9. Squeeze bottle according to claim 1, characterized in that the ventilation means comprises an opening in the wall of the squeeze bottle, the opening being designed to be impermeable for germs that are present in environmental air.

10. Squeeze bottle according to claim 1, characterized in that at least a portion of the squeeze bottle that is in contact with at least a portion of the liquid comprises an oligodynamioc or bacteriostatic agent.

11. Squeeze bottle according to claim 10, characterized in that the wall of the metering chamber comprises an oligodynamic or bacteriostatic agent.

12. Squeeze bottle according to claim 10 or 11, characterized in that the bacteriostatic or oligodynamic agent comprises a silver compound, preferably a silver zeolite.

13. Squeeze bottle according to claim 10, characterized in that the squeeze bottle is produced by molding and the bateriostatic or oilgodynamic agent is molded into the squeeze bottle at the same time.

14. Squeeze bottle according to claim 3, characterized in that the ventilating means comprises an opening in the wall or the squeeze bottle, wherein the liquid in the storage chamber is accommodated in a bag of flexible material, which bag is connected in a sealed manner with the metering chamber, and that the bag and the bellows-like body are formed from a single piece of material 15. A metering chamber intended for a squeeze bottle according to claim 1.

* * * * *